June 22, 1954

S. C. HETH ET AL 2,681,537

WINDROWER

Filed April 1, 1950

Inventors
SHERMAN C. HETH
NORMAN R. KRAUSE
WILLIAM B. TALLMAN.

By Emerson B Donnell Attorney

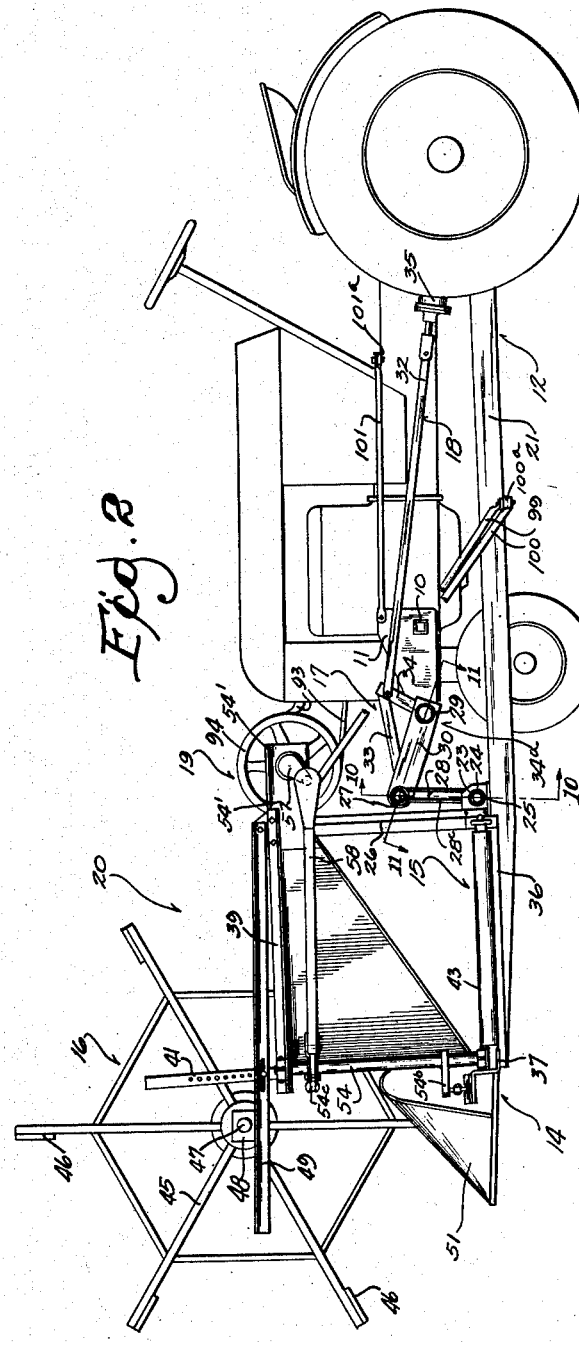

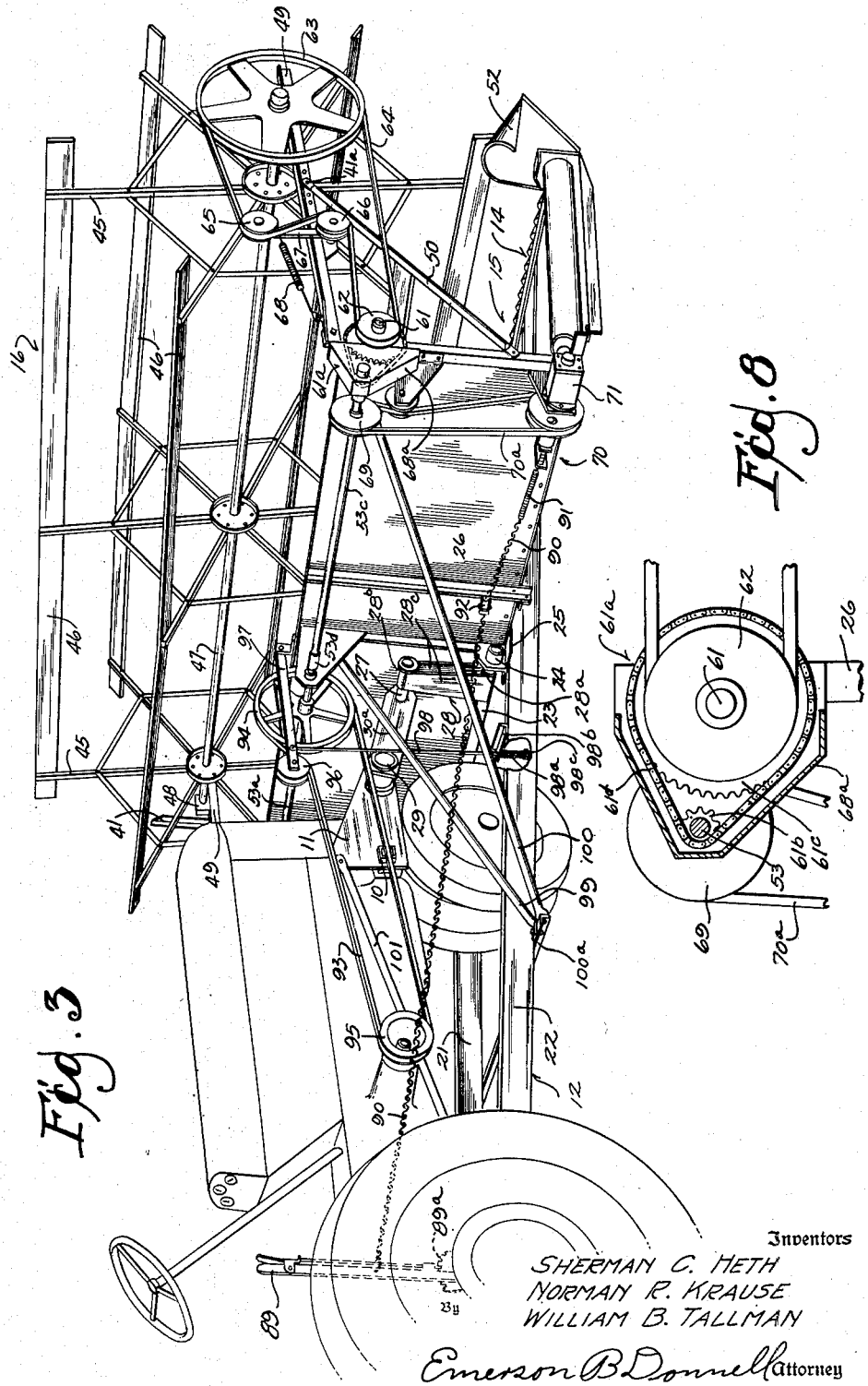

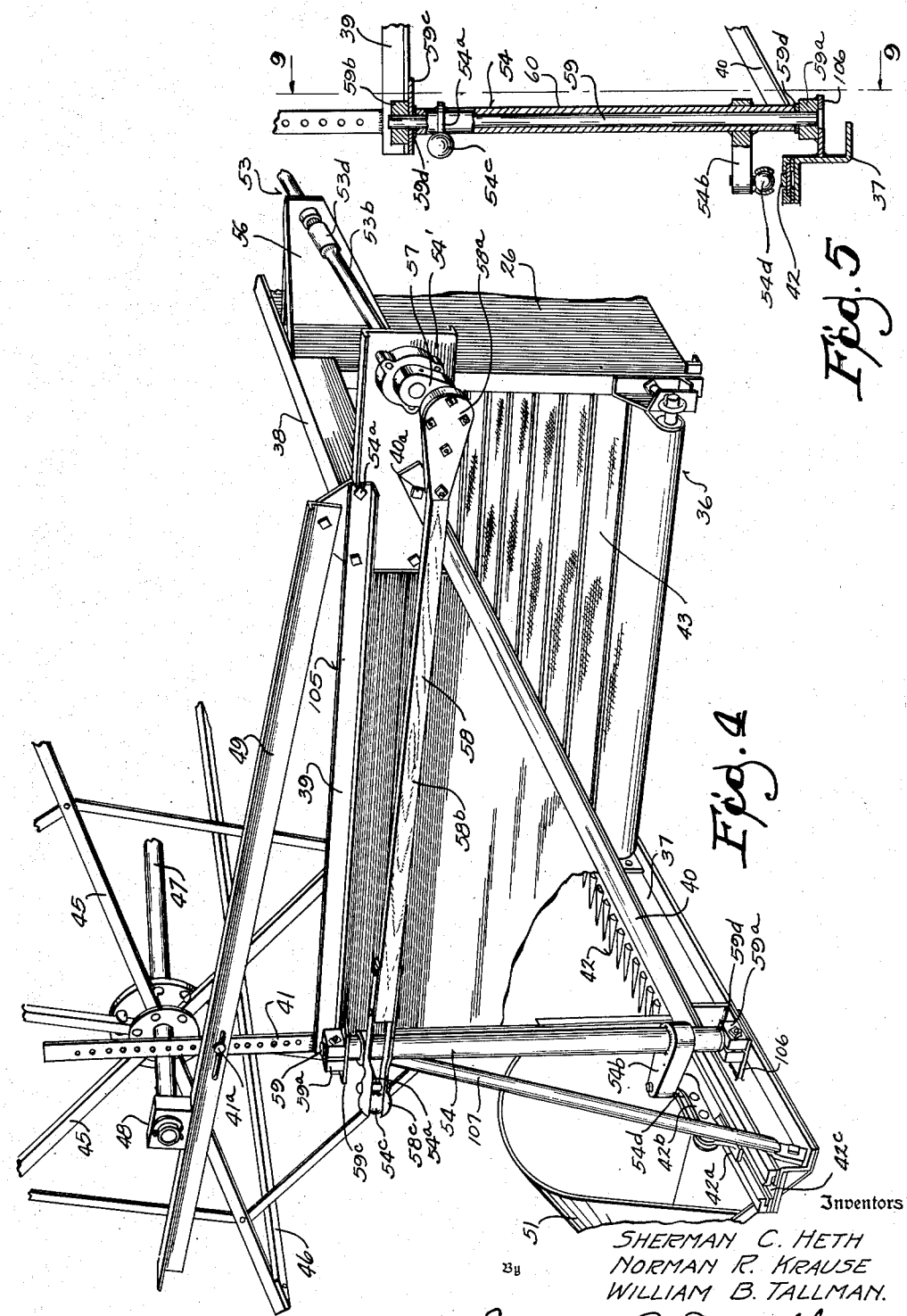

June 22, 1954
S. C. HETH ET AL
2,681,537
WINDROWER
Filed April 1, 1950
5 Sheets-Sheet 5
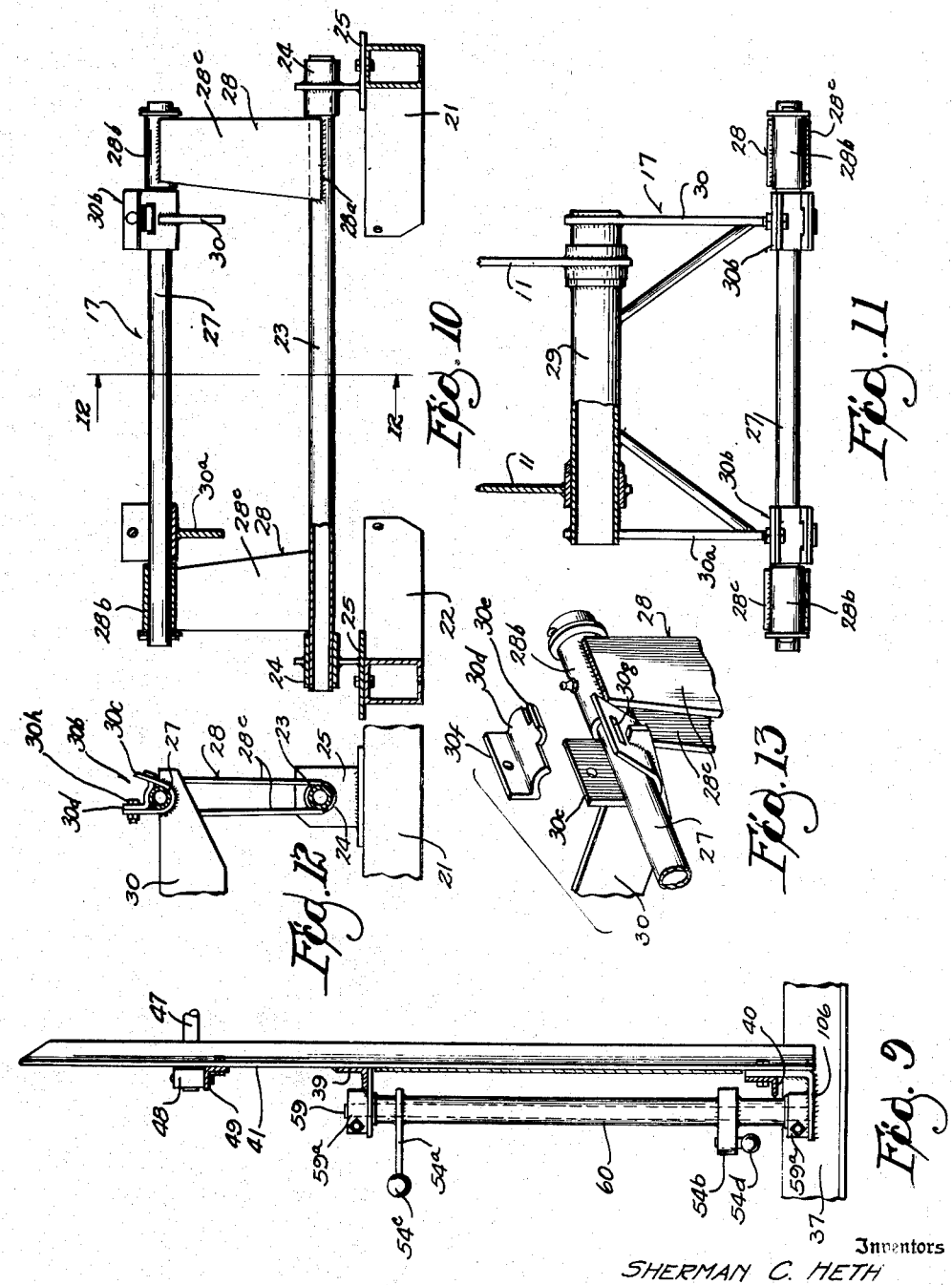
Inventors
SHERMAN C. HETH
NORMAN R. KRAUSE
WILLIAM B. TALLMAN
By Emerson B Donnell Attorney Patented June 22, 1954

2,681,537

UNITED STATES PATENT OFFICE 2,681,537

WINDROWER

Sherman C. Heth, Norman R. Krause, and William B. Tallman, Racine, Wis., assignors to J. I. Case Company, Racine, Wis., a corporation of Wisconsin Application April 1, 1950, Serial No. 153,454

13 Claims. (Cl. 56—23)

The present invention relates to harvesting machines commonly known as windrowers wherein the grain, as cut, is conveyed through an opening through which it is deposited upon the ground in the form of a windrow. Machines of this type, in order to accomplish the above functions, must be capable of such adjustment that it may accommodate grain of various heights and conditions of stand. Machines of this type must further be constructed so that they will lay the grain in windrows so that each windrow will not be traversed subsequently by the machine or the draft means as the normal harvesting operation continues.

The main objects of this invention, therefore, are to provide an improved construction of a front mounted push-type windrower. Further objects are to provide such a windrower particularly suitable for pivotal suspension from the rear of a tractor; to provide an improved mounting for grain cutting and conveying mechanism and the grain reel of a main supporting frame; to provide improved means for easily adjusting the windrower as a whole into and out of its operational position, so as to accommodate various conditions of grain to be harvested; to provide an improved arrangement for transmitting the power drive of the tractor to the several mechanisms of the harvester; to provide means whereby the travel of the conveying means of the harvester can be interrupted without interrupting the drive to the cutting means and the grain reel; and to provide a harvester having a more suitably constructed point of discharge for depositing the cut grain in a windrow and which will provide more free space for such discharge than has heretofore been possible.

In the particular embodiment of the invention herein shown:

Fig. 2 is a left-hand side elevational view of the arrangement illustrated in Fig. 1, with parts broken away.

Fig. 3 is an enlarged right-rear elevational view of the windrower and tractor illustrated in Fig. 1.

Fig. 4 is a left-rear elevational view of the discharge opening on the harvester with parts removed, slightly enlarged.

Fig. 5 is a detail partly in section and with parts broken away, of certain mechanism indicated in Fig. 4.

Fig. 6 is a horizontal axial section of the apron clutching means with parts removed, slightly enlarged.

Fig. 7 is a vertical sectional view taken on the line 7—7 of Fig. 6.

Fig. 8 is a right-side elevation of the chain reduction drive of Fig. 3, slightly enlarged and with parts removed.

Fig. 9 is an elevational sectional view taken on the line 9—9 of Fig. 5.

Fig. 10 is a sectional view, slightly enlarged, of the linkage system taken on the line 10—10 of Fig. 2, with parts removed, showing a modification.

Fig. 11 is a sectional view, slightly enlarged, of the linkage system, taken on the line 11—11 of Fig. 2 showing the same modification as Fig. 10.

Fig. 12 is a vertical section of the linkage system taken on the line 12—12 of Fig. 10.

Fig. 13 is an enlarged perspective view of the linkage system with parts removed showing the clamp construction.

Figure 1:
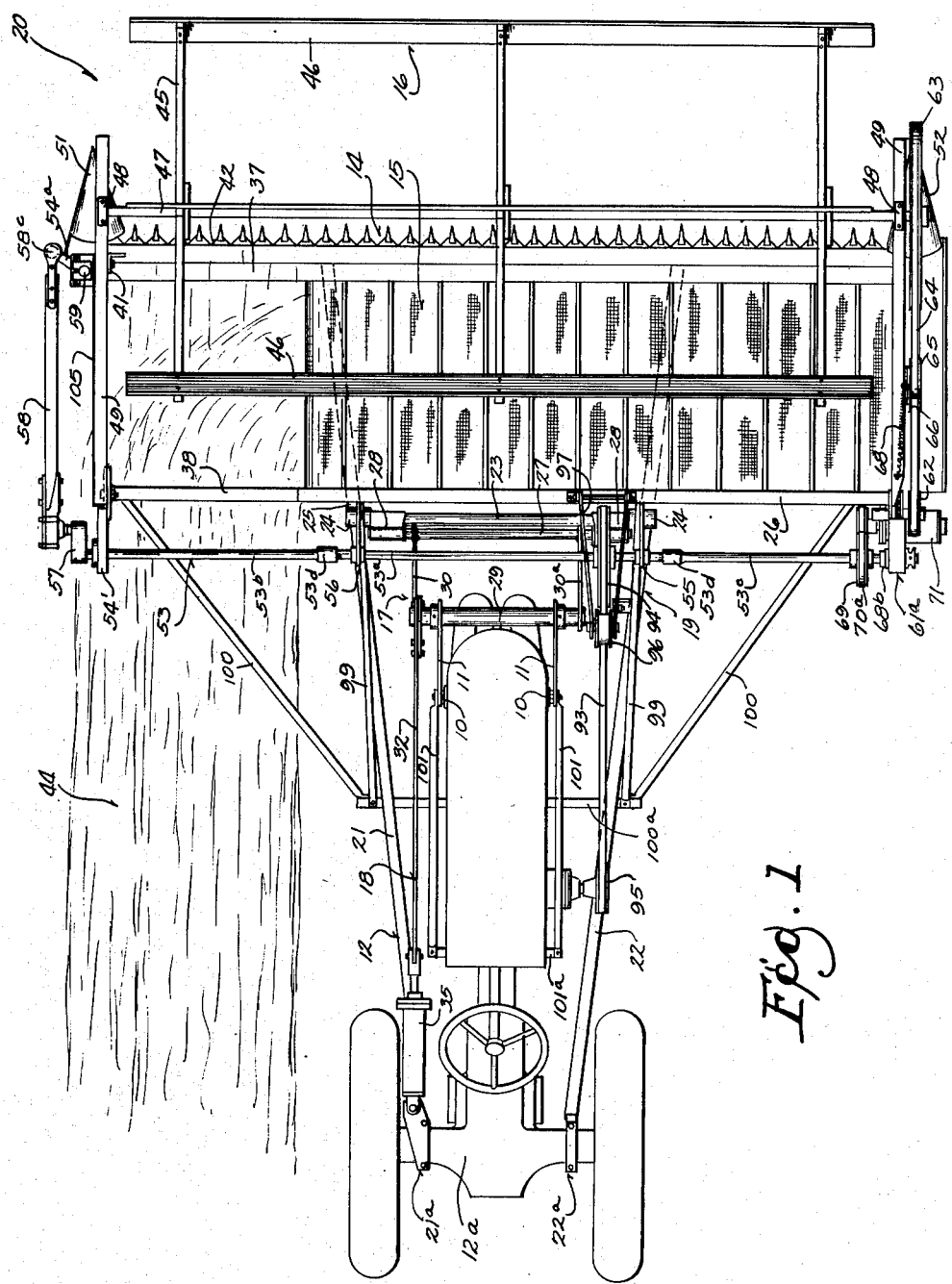
Fig. 1 is a plan view of a push-type windrower embodying the present invention, mounted on the forward end of a tractor.

A push-type windrower embodying the present invention is particularly designed for location at the forward end of a conventional type farm tractor and pivoted on the rear axle housing thereof. The front tractor frame is equipped with conventional sockets, not shown, wherein bars may be set to extend laterally from the tractor to permit the attachment of various farm implements. Support for the windrower at the front end of the tractor is provided in the form of suitable stub bars 10 formed on the brackets 11, the bars 10 being secured in the aforementioned sockets in well known manner so as to secure the brackets 11 as solidly as practicable on opposite sides of the tractor frame.

The windrower in the present instance comprises a main frame 12 which is pivotally secured to a rear axle housing 12a of the tractor, and extends forwardly therefrom, providing support forwardly of the tractor for a harvester 20 including a grain cutting mechanism 14, a grain conveying mechanism 15, and a grain reel 16. The main frame 12 is connected to the brackets 11 by a linkage system 17 which in turn is provided with a shifting mechanism 18 for lifting the windrower as a whole relative to the tractor for the purpose of adjusting the grain cutting mechanism 14 to different stands of grain. Driving means 19 for the grain cutting mechanism 14, the grain conveying mechanism 15, and the grain reel 16 is mounted on the harvester 20 and is connected to the tractor power unit as will appear clearly hereinafter.

The main frame 12 comprises a pair of arms 21 and 22, Fig. 1, positioned on opposite sides of the tractor. As previously suggested the arms 21 and 22 in the present instance are pivotally secured to the rear axle housing of the tractor in any suitable manner respectively on brackets 21ª and 22ª, and are connected to the brackets 11 by the linkage 17, the arms 21 and 22 being pivoted upwardly or downwardly by the shifting mechanism 18. The linkage system 17 includes in the present instance a bar 23 journalled in bearings 24 carried by aligned brackets 25 (see Figs. 2 and 3) secured to the support arms 21 and 22 and to an upwardly extending wall 26 of the harvester 20. A second bar 27 is carried above the bar 23 as by spacer links 28 (see also Fig. 3). The spacers 28 include in the present instance sleeves 28ᵇ which are carried adjacent the ends of the bar 27 so as to turn thereon. Plates 28ᶜ are secured as by welding or the like to the periphery of the sleeves 28ᵇ, and to the periphery of the bar 23 as at 28ª so as to support the bar 27 above the bar 23 as previously suggested. The brackets 11 adjacent their forward ends rotatably support in the present instance a tubular member 29 which has suitably secured adjacent its respective ends lifting arms 30 and 30ª which are secured forwardly with respect to the tubular member 29 to the bar 27 as by welding or the like. It will be apparent that pivotal movement of the support arms 21 and 22 can be effected by rotating the tubular member 29 in the brackets 11.

The linkage construction shown in Figs. 10-13 inclusive is substantially like that shown in Figs. 1-3 inclusive, the bars 23 and 27 and the spacers 28 being similar to those shown in the previous embodiment. In this modification the bars 27 are movably supported on the lifting arms 30 and 30ª by means of saddle brackets 30ᵇ so that the harvester 20 can be disconnected from the forward end of the tractor without requiring the removal of the brackets 11 from the tractor. The saddle brackets 30ᵇ include, in the present instance, downwardly curved saddle portions 30ᶜ secured as by welding or the like adjacent the forward ends of the arms 30 and 30ª so as to accommodate therein the bar 27. Clamps 30ᵈ, for preventing up and down movement of the bar 27 in the saddle portions 30ᶜ, are provided and include in the present instance forwardly extending lips 30ᵉ and rearward flanges 30ᶠ. The lips 30ᵉ are inserted in slots 30ᵍ formed in the saddle portion and maintained against the bar 27 by means of bolts or the like 30ʰ accommodated in aligned holes formed in the flanges 30ᶠ and the rearward surface of the saddle portion 30ᶜ. It will be apparent that the clamp can be easily removed from the saddle portions by removal of bolt 30ʰ so that the bar 27, upon the harvester 20 being rested upon the ground, can be easily removed from the saddle portions and the windrower removed from the tractor without the removal of the brackets 11.

For rotating or maintaining the tubular member 29 in the brackets 11 for adjustably positioning the windrower so as to accommodate different stands and conditions of grain, the shifting mechanism 18 is provided as previously suggested. The shifting mechanism includes in the present instance an actuating bar 32, Figs. 1 and 2, pivotally connected forwardly to portions 33 and 34 which are secured as by welding or the like to the lifting arm 30 and constitute one arm of a bell crank 34ª. Rearwardly the actuating bar in the present instance is connected to a conventional hydraulic ram 35 preferably supported on above mentioned bracket 21ª, and which is operatively connected to the power source, not shown, of the tractor in any known or suitable manner. It will now be apparent that when the ram in the present instance is retracted the actuating bar 32 pulls upon the lifting arm 30 thereby rotating the tubular member 29 in the brackets 11 and moving the lifting arm 30ª a distance equal to that moved by the arm 30 in the same direction which, as previously described, pivots the main frame 12 upwardly a proportionate distance, the lifting force exerted by the lifting arms being transmitted to the arms 21 and 22 by means of the spacers 28 and the bars 23 and 27. For effecting downward pivotal movement of the main frame, the hydraulic ram is expanded the required amount, the weight of the windrower being sufficient to bias the main frame downwardly until sustained by the shifting mechanism 18 at the desired elevation.

The harvester 20 is carried transversely on the main frame 12 substantially normal to the direction of travel of the tractor. The harvester includes a platform 36 and the upwardly extending wall 26. As seen in Fig. 1 the platform 36 in the present instance terminates substantially adjacent the support arm 21 and is provided with a guard frame 37, of the usual type, which is positioned so as to extend along the forward end of the platform and laterally from the end of the platform to the left of the operator of the tractor. The wall member 26 is secured rearwardly of the platform 36, is substantially coextensive therewith, and extends upwardly therefrom as already suggested.

For laying the cut material in a windrow, an unobstructed discharge opening is formed between the end of the platform 36 adjacent the arm 21 and an end member 105 best seen in Fig. 4. The end member 105 includes in the present instance a support bar 41 which is secured at one end to an angle-shaped bracket 106 which in turn is secured to the laterally extending portion of the guard frame 37 adjacent the end thereof so as to extend upwardly substantially normal thereto. A bar 107 is braced between the end of the guard frame 37 and the support bar 41. A second bar 39, preferably in the form of an angle bar is secured as by welding or the like to the support bar 41 remote from the guard frame 37 as to lie preferably substantially in a plane passing through the upper surface of the wall member 26 parallel to the platform 37 and extends rearwardly substantially in the plane of the wall member 26. A bracket 54' is secured as by bolts or other suitable means 54ª to the end of the angle bar 39 and extends rearwardly therefrom for rotatably supporting therein a driving shaft 53 for imparting reciprocatory motion to a sickle 42 on guard frame 37 as will be explained hereinafter. For supporting the angle bar 39 a strut 40 is provided braced between the supporting bar 41 adjacent the guard frame 37 and the bracket 54' adjacent the end of the bar 39 as by bolts or the like 40ª. For rigidly maintaining the end member 105 with respect to the guard frame 37, a frame member 38 is provided rigidly secured between the bracket 54' adjacent the rearward ends of the bars 39 and 40 and the upper end of the wall member 26. It should be appreciated that this construction besides being structurally strong and easy to manufacture provides a discharge opening which is rearwardly and laterally free of any downwardly or rearwardly extending frame members which would tend to interfere with the windrow being formed.

The grain cutting mechanism 14 and the conveying mechanism 15 are both of conventional design. The former embodies the sickle 42 reciprocatably mounted in any suitable manner on the guard frame 37. The latter mechanism embodies a canvas apron, or draper 43 equipped with the usual strips, and extends around rollers journalled at opposite sides of the platform 36. As will be more fully pointed out, this apron or draper travels toward the left of the operator of the tractor so that the grain is laid in a windrow 44 formed adjacent the left end of the platform 36 between the platform and the end member 105 as already suggested.

The grain reel mechanism 16 is likewise of conventional structure. It comprises the usual radially arranged arms 45 (see also Fig. 3) connected by bats 46 and secured to a shaft 47. The shaft 47 is mounted in bearings 48 carried on arms 49—49 which are pivotally secured respectively to the bracket 54' and to the wall member 26, and maintained in their proper pivoted position by bolts or the like 41ª—41ª to the support bar 41 and to a support arm 40 respectively. It should be clear that the grain reel can be adjusted to accommodate various differences in the stands of grain by positioning the arms 49 with respect to the support arm 50 and the bar 41 so as to support the arms 49 in their proper pivoted position in a manner well known in the art.

Dividers 51 and 52, of conventional design and arrangement, are secured adjacent the ends of the guard frame 37 so as to extend forwardly therefrom for well known purposes.

The driving mechanism 19 for the windrower comprises a main shaft 53 journalled in bearings not shown secured in above mentioned bracket 54' on the end member 105 and in brackets 55 and 56 on the member 26 so as to extend substantially parallel with the horizontal and the wall member 26 substantially co-extensive therewith.

As clearly seen in Fig. 1 the shaft 53 is made up in the present instance of three sections 53ª, 53ᵇ and 53ᶜ axially connected together by means of suitable flexible connections 53ᵈ of any suitable type well known in the art for compensating for slight misalignment and bending of the shaft 53 when the machine is operated upon rough terrain. Adjacent the left end of the shaft 53 is a crank 57 which, by means of a suitable pitman 58, is connected to a bell-crank lever 54 which in turn is connected to the sickle bar 42.

The bell-crank lever 54, as more particularly shown in Fig. 5, is formed of a tubular shaft 60 which is journalled on a thrust shaft 59 which is in turn secured between aligned sockets 59ª and 59ᵇ secured respectively, by welding or the like, to the bracket 106 and to a laterally extending bracket 59ᶜ secured to the angle bar 39 adjacent the support bar 41. Washers 59ᵈ are positioned between the respective ends of the tubular shaft 60 and the socket 59ª and the bracket 59ᶜ for providing a smooth surface for the ends of the shaft 60 to rotate upon. The tubular shaft 60 has formed or secured thereon adjacent its upper end a bell crank arm 54ª for attachment to the pitman 58 as already suggested. A bell crank arm 54ᵇ is formed or secured adjacent the lower end of the tubular shaft 60 for attachment to the sickle in any well known or suitable way for imparting the reciprocatory motion of the shaft 60 thereto. It should be appreciated that the tubular construction of the shaft 60 has a certain torsional resiliency which aids in absorbing shock due to the change in direction of the pitman when the windrower is in operation.

The pitman may be of any conventional or suitable construction comprising, in the present instance, a self-aligning bearing 58ª for attachment to the crank 57. Secured to the bearing 58ª and extending forwardly therefrom is a pitman shaft 58ᵇ, preferably made of wood, which in turn has secured adjacent its forward end suitable pitman jaws 58ᶜ for securing a spherical bearing member 54ᶜ formed adjacent the end of the bell crank arm 54ª in a manner well known in the art. The bell crank arm 54ᵇ has formed thereon a spherical bearing member 54ᵈ which is connected to a suitable sickle head 42ª by means of convenient or suitable connecting straps 42ᵇ. It will be apparent that when the bell crank 54 is actuated by the pitman 58, that the sickle head 42ª will be reciprocated in a guideway 42ᶜ for operating the sickle 42 in a manner well known in the art.

Rotation of the grain reel is effected in the present instance by means of a chain reduction drive 61ª, Figs. 3 and 8, interposed between the shaft 53 adjacent its right end and a shaft 61 rotatably secured to the wall 26 adjacent the upper end thereof so as to extend laterally therefrom. The reduction drive includes in the present instance a sprocket 61ᵇ fixed to the end of the shaft 53 and a sprocket 61ᶜ fixed to the shaft 61 and operatively connected to the sprocket 61ᵇ by means of an endless chain 61ᵈ of any suitable type. As seen in Fig. 8 the sprocket 61ᶜ is considerably larger than the sprocket 61ᵇ so that the rotation imparted to the shaft 61 from the shaft 53 is substantially slower than that of shaft 53. Adjacent the end of the shaft 61 is a driving pulley 62 which is operatively connected to a driven pulley 63 of the grain reel mechanism 16 by means of a belt or the like 64. It will be apparent that the differences in size between the sprocket 61ᵇ and the sprocket 61ᶜ and between the pulley 62 and the pulley 63 will effect a very slow rate of rotation to the grain reel in comparison to the rate of rotation of the shaft 53. The exact sizes of these sprockets and pulley wheels can best be determined by experiment, consideration being given to the rate of rotation imparted to the shaft 53 from the tractor, the forward speed, and the type of crop to be harvested. For maintaining the belt taut irrespective of the position of the grain reel, pulleys 65 and 66 are provided on a pivotal arm 67. It will be seen that the belt travels under the pulley 66 and over the pulley 65. A spring 68 constantly urges arm 67 rearwardly, thereby pressing the pulleys 65 and 66 against the belt 64 as should be clear from the drawings. A chain guard 68ª is provided for enclosing the chain 61ᵈ and has a bearing 68ᵇ for rotatably supporting the end of the shaft 53 with the harvester 20.

For effecting rotation of the conveying mechanism 15 from the shaft 53, a pulley 69 is provided on the shaft 53 adjacent the guard 68ª and is operatively connected to a clutching mechanism 70 as by a belt 70ª for imparting the rotary motion of the shaft 53 to the apron driving roll adjacent the right end of the platform by means of conventional bevel gears enclosed in a gear box 71. As can be seen in Figs. 6 and 7, the clutching mechanism 70 comprises, in the present instance, a pulley 72 freely rotatably journalled on an input shaft 73 projecting from the gear box 71, the gear box 71 being supported from the harvester 20 by a bracket 74. Slidably keyed on the shaft 73 is a sleeve or casting 75 provided with a flange 76 having a stud or the like 76ª secured thereto offset from sleeve 75, and extending toward and registering with holes 77 formed in the pulley 72. For maintaining the casting 75 in clutching engagement with the pulley 72 for transmitting the rotary motion of the shaft 53 to the conveying mechanism 16, a shaft 78 is provided journalled in the end of the casting 75 by an anti-friction thrust bearing 79. The shaft 78 is prevented from moving axially in the bearing 79 by means of a lock ring 80 and a shoulder 81 formed on the shaft 78 adjacent the bearing, while the bearing is prevented from moving axially in the casting by means of a shoulder 82 formed in the casting and a lock ring 83. The shaft 78 is supported inwardly of casting 75 in a U-shaped bracket 84 secured to the wall member 26 and has compressed thereon between slidable washers 85 and 86, located between rearwardly extending arms 86ª and 86ᵇ of the U-shaped bracket 84, a compression spring 87. It will be apparent from the drawings that the compression spring 87 exerts a constant pressure against the washer 85 which is pressed against a shoulder 88 formed on the shaft 78 to constantly urge the casting 75 and its attached parts into clutching engagement with the pulley 72. For disengaging the casting 75 from the pulley 72 for stopping the travel of the conveying mechanism 15 independently of the rotation of the shaft 53, a clutch lever 89, Fig. 3, is provided pivotally secured on the tractor frame adjacent the operator's seat and provided with the usual spring actuated pawl for engagement with the teeth of a quadrant 89ª. The clutch lever is connected to the shaft 78 by means of a chain 90 and a tension spring 91, the chain 90 being directed around the pulley 92. It should be apparent from the drawings that when the operator wishes to disengage the clutching mechanism 70 so that the travel of the conveying mechanism 15 will be stopped, he needs only to pivot the clutch lever rearwardly sufficiently so that the pull exerted by the chain 90 and the tension spring 91 upon the shaft 78 is sufficient to overcome the force exerted by the spring 87. When the force of the spring 87 tending to maintain the casting 76 in clutching engagement with the pulley 72 is overcome, the casting will be moved axially sufficiently to move the stud 76ª out of one of the holes 77 thereby disengaging the clutch mechanism 70 and consequently stopping the travel of the conveying mechanism.

The driving of the shaft 53 is effected by means of a belt 93 connected to a pulley 94 supported on the shaft 53 and to a pulley 95 which is a part of the tractor power unit, commonly known as the belt pulley. For maintaining the belt 93 taut at all times an idler pulley 96 is rotatably secured in a pivotal bracket 97, the pivotal bracket 97 being downwardly urged with respect to the main frame by a spring 98ª engaged between a bracket 98ᵇ on above mentioned member 22 and a nut 98ᶜ on a link 98.

For maintaining the harvester rigid on the main frame, bars 99 and 100 are inserted between a cross member 100ª secured to members 21 and 22, and serving to unite and stiffen the main frame, and the upper portion of back wall 26 of the harvester. To enable the stub bars 10 of the brackets 11 to withstand the thrust exerted by the shifting mechanism 18 and the linkage system 17, bars 101 are provided as braces between the brackets 11 and a cross member 101ª on the tractor frame rearwardly of the brackets 11.

A windrower constructed in accordance with this disclosure can be mounted on, or dismounted from, the forward end of a tractor with comparative ease and in a very short time. The attachment of the windrower requires only the setting of the stub bar 10 of the brackets 11, pivotally connecting the main frame 12 to the rear axle housing of the tractor, the attachment of the actuating bar to the hydraulic ram, the putting on of the belt 93, and the connecting of the chain 90 to the clutch controlling lever 89. The detachment of the windrower from the tractor would call merely for a reversal of these connections. When the windrower is positioned so as to elevate the grain cutting mechanism, the conveying mechanism and the grain reel mechanism, the windrower may be inoperatively transported from place to place.

In the operation of this windrower the grain cut by the cutting mechanism 14 adjacent the front end of the platform 36 will fall upon the conveying mechanism 15 upon being swept rearwardly by the grain reel 16 whereupon it will be carried to the left of the operator and deposited in the windrow 44. The grain cut by that portion of the cutting mechanism extending to the left of the platform 36 will fall rearwardly upon being urged by the sweep of the grain reel so as to lie in the windrow 44 which is being formed by the conveying mechanism 15 thereby providing a convenient "hole in the platform" and "over-end" discharging means on the harvester for laying the cut grain in a windrow. It should be further appreciated that by providing a discharge opening between the end member and the adjacent end of the platform, as described that the grain as cut is free to fall substantially rearwardly and laterally free of any obstructing supporting structures or rotating shafts which would tend to disturb the uniform continuity of the windrow as it is formed.

We claim:

1. A harvester having a transverse platform, a rear wall co-extensive therewith, and a sickle secured to the forward edge of said platform and extending laterally to a point of termination spaced from said platform, an end member adjacent said point of termination extending rearwardly to the plane of said rear wall and sufficiently spaced from said platform for defining an unobstructed crop-discharge opening between said platform and said end member opening rearwardly and laterally, a frame member extending above said discharge opening between said rear wall and said end member and elevated sufficiently to clear a windrow being formed by the harvester, a driving shaft rotatably supported from said wall and said end member above said discharge opening, and a sickle driving means above the laterally open portion of the discharge opening for driving said sickle from said drive shaft.

2. A harvester having a transverse platform, a rear wall co-extensive therewith, and a sickle secured to the forward edge of said platform and extending laterally to a point of termination spaced from said platform, an end member adjacent said point of termination extending rearwardly to the plane of said rear wall and sufficiently spaced from said platform for defining an unobstructed crop-discharge opening between said platform and said end member opening rearwardly and laterally, a frame member extending above said discharge opening between said rear wall and said end member and elevated sufficiently to clear a windrow being formed by the harvester, a drive shaft rotatably supported from said wall and said end member above said discharge opening, a sickle driving means comprising a bell crank rotatably secured adjacent said end member laterally of said discharge opening, said bell crank having an arm connected to said sickle, a second arm vertically spaced from the first mentioned arm, a crank on said drive shaft, and a pitman connecting said second arm with said crank and elevated to clear the windrow being formed in the discharge opening.

3. A harvester having a transverse platform, a rear wall co-extensive therewith, and a sickle secured to the forward edge of said platform, an end member adjacent a point of termination extending rearwardly to the plane of said rear wall and sufficiently cleared from said platform for defining an unobstructed crop-discharge opening between said platform and said end member opening rearwardly and laterally, a frame member extending above said discharge opening between said rear wall and said end member and elevated sufficiently to clear a windrow being formed by the harvester, a drive shaft rotatably supported from said wall and said end member above said discharge opening, a sickle driving means comprising a thrust shaft secured adjacent said end member and laterally of the crop discharge opening, a bell crank journaled on said thrust shaft, said bell crank having an arm connected to said sickle, a second arm vertically axially spaced from the first mentioned arm, a crank on said drive shaft, and a pitman connecting said second arm with said crank.

4. A harvester having a transverse platform, a rear wall co-extensive therewith, and a sickle secured to the forward edge of said platform, an end member adjacent a point of termination extending rearwardly to the plane of said rear wall and sufficiently spaced from said platform for defining an unobstructed crop-discharge opening between said platform and said end member opening rearwardly and laterally, a frame member extending above said discharge opening between said rear wall and said end member and elevated sufficiently to clear a windrow being formed by the harvester, a drive shaft rotatably supported from said wall and said end member above said discharge opening, a sickle driving means comprising a thrust shaft secured adjacent said end member substantially normal to said sickle and laterally of said crop discharge opening, a bell crank journaled on said thrust shaft, said bell crank having an arm connected to said sickle, a second arm vertically axially spaced from the first mentioned arm, a crank on said drive shaft, and a pitman connecting said second arm with said crank.

5. A harvester having a transverse platform, a rear wall co-extensive therewith, and a sickle secured to the forward edge of said platform and extending laterally to a point of termination spaced from said platform, an end member adjacent said point of termination extending rearwardly to the plane of said rear wall and sufficiently spaced from said platform for defining an unobstructed crop-discharge opening between said platform and said end member opening rearwardly and laterally, a frame member extending above said discharge opening between said rear wall and said end member and elevated sufficiently to clear a windrow being formed by the harvester, a drive shaft rotatably supported from said wall and said end member above said discharge opening, a sickle driving means comprising a bell crank rotatably secured adjacent said end member and laterally of said discharge opening on an axis substantially normal to said sickle, said bell crank having an arm connected to said sickle, a second arm vertically axially spaced from the first mentioned arm, a crank on said drive shaft, and a pitman connecting said second arm with said crank.

6. A harvester having a transverse platform, a rear wall co-extensive therewith, and a guard frame provided with a sickle secured to the forward edge of said platform and extending laterally to a point of termination spaced from said platform, an end member adjacent said point of termination and spaced from said platform and comprising a support bar secured with said guard frame and extending upwardly therefrom, a second bar secured with said support bar remote from said guard frame and extending rearwardly to the plane of said rear wall, and a strut braced between said support bar and said second bar remote from said support bar for forming a crop discharge opening between said end member and said platform opening rearwardly and laterally, a frame member extending above said discharge opening between said end member and said wall and elevated sufficiently to clear a windrow being formed by the harvester, a drive shaft extending laterally along the upper edge of said wall and rotatably supported from said wall and said end member, a sickle drive means comprising a bell crank having an arm connected to said sickle, a second arm vertically axially spaced from the first mentioned arm, a crank on said drive shaft, and a pitman connecting said second arm and said crank.

7. A harvester having a transverse platform, a rear wall co-extensive therewith, and a guard frame provided with a sickle secured to the forward edge of said platform and extending laterally to a point of termination spaced from said platform, an end member adjacent said point of termination and spaced from said platform and comprising a support bar secured with said guard frame and extending upwardly therefrom substantially normal thereto, a second bar secured with said support bar remote from said guard frame and extending rearwardly therefrom to the plane of said rear wall and substantially normal to the support bar, a rearwardly extending supporting bracket secured adjacent the end of said second bar, and a strut braced between said support bar and said second bar for forming a crop discharge opening between said platform and said end member opening rearwardly and laterally, a frame member extending sufficiently above said discharge opening between said end member and said wall to clear a windrow being formed by the harvester, a drive shaft extending laterally sufficiently above said discharge opening to clear said windrow being formed and rotatably carried by said supporting bracket, a sickle driving means comprising a bell crank having an arm connected to said sickle, a second arm vertically axially spaced from the first mentioned arm, a crank on said drive shaft laterally of said supporting bracket, and a pitman connecting said second arm and said crank.

8. A harvester having a transverse platform, a rear wall co-extensive therewith, and a guard frame provided with a sickle secured to the forward edge of said platform and extending laterally to a point of termination spaced from said platform, an end member adjacent said point of termination and spaced from said platform and comprising a supporting bar secured with said guard frame and extending upwardly therefrom substantially normal thereto, a second bar secured with said supporting bar remote from said guard frame and extending rearwardly therefrom to the plane of the rear wall substantially normal to the supporting bar, a rearwardly extending supporting bracket secured adjacent the end of said second bar, and a strut braced between said supporting bar and said second bar for forming a crop discharge opening between said platform and said end member opening rearwardly and laterally, a frame member extending sufficiently above said discharge opening between said end member and said wall to clear a windrow being formed by the harvester, a drive shaft extending laterally sufficiently above said discharge opening to clear said windrow being formed and rotatably carried by said supporting bracket, a sickle drive means comprising a thrust shaft secured adjacent said end member substantially normal to said guard frame, a bell crank journaled on said thrust shaft, said bell crank having an arm connected to said sickle, a second arm vertically axially spaced from the first mentioned arm, a crank on said drive shaft laterally of said supporting bracket, and a pitman connecting said second arm and said crank.

9. A harvester having a transverse platform, a rear wall co-extensive therewith, and a guard frame provided with a sickle secured to the forward edge of said platform and extending laterally to a point of termination spaced from said platform, an end member adjacent said point of termination spaced from said platform and comprising a support bar secured with said guard frame and extending upwardly therefrom substantially normal thereto, a second bar secured with said support bar remote from said guard frame and extending rearwardly therefrom to the plane of said rear wall and substantially normal to the support bar, a rearwardly extending supporting bracket secured adjacent the end of said second bar, and a strut braced between said support bar and said second bar for forming a crop discharge opening between said platform and said end member opening rearwardly and laterally, a frame member extending sufficiently above said discharge opening between said end member and said wall to clear a windrow being formed by the harvester, a drive shaft extending laterally sufficiently above said discharge opening to clear said windrow being formed and rotatably carried by said supporting bracket, a sickle drive means comprising a thrust shaft, aligned sockets for carrying said thrust shaft substantially normal to said guard frame adjacent said end member, a bell crank journaled on said thrust shaft, said bell crank having an arm connected to said sickle, a second arm vertically axially spaced from said first mentioned arm, a crank on said drive shaft laterally of said supporting bracket, and a pitman connecting said second arm and said crank.

10. A harvester construction comprising a harvesting platform, a back wall extending upwardly from said platform, an apron on said platform substantially co-extensive with said back wall, a cutter bar on the forward margin of said platform and extending beyond one end of said apron, an upright on the cutter bar at the end thereof spaced from said apron, a frame portion extending from an upper margin of said wall to substantially the same extent that the cutter bar extends beyond the apron, a frame member joining said upright and said frame portion and a brace extending rearwardly and upwardly from the point of juncture of said cutter bar and said upright and joined with said frame portion substantially at its point of juncture with said frame member, said upright, said frame member, and said brace being spaced sufficiently from the one end of said apron for forming a crop discharge opening rearwardly and laterally.

11. A harvester construction comprising a harvesting platform, a back wall extending upwardly from said platform, an apron on said platform substantially co-extensive with said back wall, a cutter bar on the forward margin of said platform and extending beyond one end of said apron, an upright on the cutter bar at the end thereof spaced from said apron, a frame portion extending from an upper margin of said wall at said end of said platform to substantially the same extent that the cutter bar extends beyond the apron, a frame member joining the upper end of said upright and said frame portion and a brace extending rearwardly and upwardly from the point of juncture of said cutter bar and said upright and joined with said frame portion substantially at its point of junction with said frame member, said upright, said frame member, and said brace being spaced sufficiently from the one end of said apron for forming a crop discharge opening rearwardly and laterally.

12. In a front-mounted windrowing machine for use with a tractor the combination of spaced forwardly directed supporting arms on opposite sides of said tractor, a harvesting platform extending transversely of said arms at the forward extremities thereof in front of said tractor, a back wall for said harvester, an apron substantially co-extensive with said back wall, a cutter bar on the forward margin of said platform and extending beyond one end of said apron, an upright on the cutter bar at the end thereof spaced from said apron, a frame portion extending from an upper margin of said wall to substantially the same extent that the cutter bar extends beyond the apron, a frame member joining said upright and said frame portion and a brace extending rearwardly and upwardly from the point of juncture of said cutter bar and said upright and joined with said frame portion substantially at its point of junction with said frame member, said upright, said frame member, and said brace being sufficiently spaced from the one end of said apron for forming a crop discharge opening rearwardly and laterally, a crank shaft extending along said frame portion and elevated sufficiently to clear a windrow being formed in the discharge opening, a crank on said crank shaft laterally of said discharge opening, a rock shaft extending along said upright laterally of said discharge opening, a pitman connected with said crank, extending along said frame member and also connected for rocking said rock shaft, a sickle on said cutter bar, and a connection from said rock shaft for actuating said sickle.

13. In a push-type windrower for employment with a tractor comprising a harvester including a cutting mechanism, a grain-reel, and a conveying mechanism, a pair of frame members on opposite sides of the tractor for pivotally supporting said harvester in front of said tractor from the rear thereof, means for pivoting said frame members from said tractor for variably positioning said harvester with respect to said tractor, a driving shaft rotatably secured with said harvester and co-extensive therewith and drivingly connected adjacent its opposite ends to said cutting mechanism and said grain-reel for imparting the rotary motion of said tractor to said cutting mechanism and said grain-reel, driving means interposed between the tractor and said driving shaft, and a driving means interposed between said driving shaft and said conveying mechanism for imparting the rotary motion of said driving shaft to said conveying mechanism for carrying the cut material to one end of said harvester, the second mentioned driving means having interposed therein a driven element, a driving element, one of said elements having means for engagement with the other element, resilient means for urging said elements into engagement, and means for disengaging said elements for interrupting the transmission of motion from said driving shaft to said other element for stopping the travel of said conveying mechanism.

References Cited in the file of this patent

UNITED STATES PATENTS

| Number | Name | Date |
|---|---|---|
| 1,196,430 | Burchell | Aug. 29, 1916 |
| 1,278,102 | Burgess | Sept. 10, 1918 |
| 1,278,569 | Beaushene | Sept. 10, 1918 |
| 1,447,823 | Thomas | Mar. 6, 1923 |
| 1,734,401 | Raney | Nov. 5, 1929 |
| 1,763,831 | Tauber | June 17, 1930 |
| 1,816,519 | Ewing et al. | July 28, 1931 |
| 1,847,288 | Worthington | Mar. 1, 1932 |
| 1,906,498 | Templeton | May 2, 1933 |
| 1,917,352 | Apel | July 11, 1933 |
| 2,344,663 | Wood | Mar. 21, 1944 |
| 2,395,672 | Kranick et al. | Feb. 26, 1946 |
| 2,471,073 | Meskimen | May 24, 1949 |
| 2,473,655 | Lohn | June 21, 1949 |
| 2,486,747 | Johnson | Nov. 1, 1949 |
| 2,487,144 | Kriedeman | Nov. 8, 1949 |
| 2,492,223 | Jenson | Dec. 27, 1949 |
| 2,530,668 | Tallman | Nov. 21, 1950 |
| 2,582,103 | Dean | Jan. 8, 1952 |